United States Patent

Hansen

[15] 3,703,165
[45] Nov. 21, 1972

[54] FUEL TANK VENT CONTROL
[72] Inventor: Kai H. Hansen, Birmingham, Mich.
[73] Assignee: General Motors Corporation, Detroit, Mich.
[22] Filed: July 15, 1971
[21] Appl. No.: 162,995

[52] U.S. Cl..................................123/136, 137/202
[51] Int. Cl..............................................F02m 25/08
[58] Field of Search......123/136; 220/85 VR, 85 VS; 261/72 R, 22; 137/202

[56] References Cited

UNITED STATES PATENTS

| | | |
|---|---|---|
| 3,650,256 | 3/1972 | Marshall....................123/136 |
| 3,575,152 | 4/1971 | Wentworth................123/136 |
| 3,548,797 | 12/1970 | Hagihara..................261/72 R |
| 3,221,724 | 12/1965 | Wentworth................123/136 |
| 2,860,656 | 11/1958 | Eshbaugh..................123/136 |
| 2,708,944 | 5/1955 | Modine......................137/202 |

Primary Examiner—Laurence M. Goodridge
Assistant Examiner—Cort Flint
Attorney—J. L. Carpenter et al.

[57] ABSTRACT

In an internal combustion engine powered vehicle, fuel vapors are vented from the fuel tank to the engine induction system. The tank vent line is controlled by a valve operated both by a float responsive to the fuel level and by a solenoid energized through the engine ignition switch.

4 Claims, 3 Drawing Figures

INVENTOR.
Kai H. Hansen

Kai H. Hansen
BY
C. K. Veenstra
ATTORNEY

FUEL TANK VENT CONTROL

There have been several prior art proposals for controlling a fuel tank vent line with a float mechanism responsive to the level of liquid fuel within the tank to prevent loss of liquid fuel through the line. In addition, at least one prior art proposal suggests use of a solenoid operated valve for closing a vent line extending from a fuel tank to an engine induction system to prevent loss of fuel vapor when the engine is not operating.

This invention provides a compact valve mechanism combining float and solenoid control of a fuel tank vent valve into a single unit which may be easily mounted in the top of a vehicle fuel tank.

The details as well as other objects and advantages of this invention are set forth below and shown in the drawings in which:

FIG. 1 is a schematic view of an internal combustion engine powered vehicle fuel tank venting system showing in section the details of construction of the fuel tank vent control provided by this invention and of a vapor flow control valve which may be used in conjunction with this invention;

Figure 2:
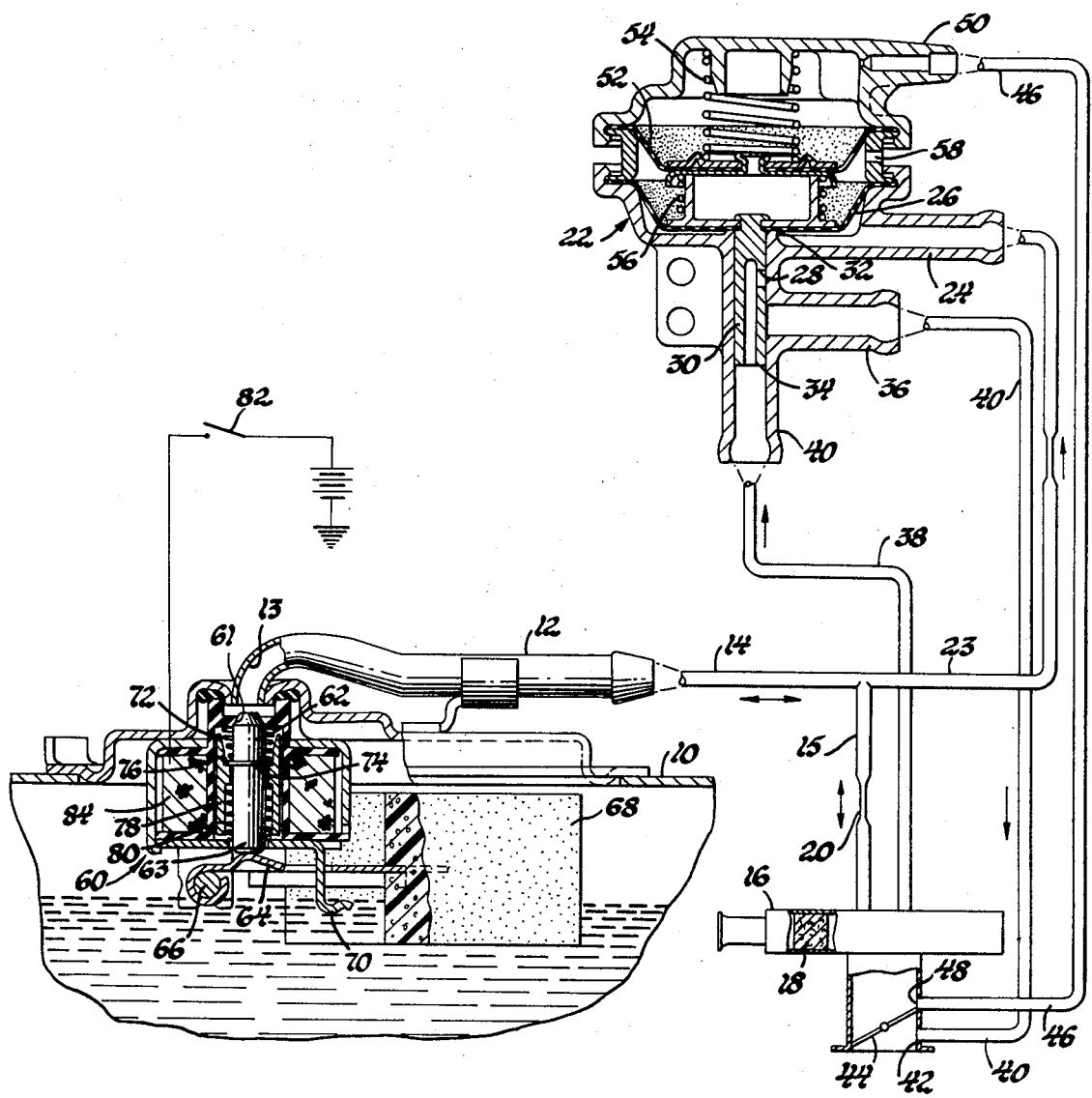
FIG. 2 is a schematic sectional view of an alternative embodiment of the vent control shown in FIG. 1.
Figure 2:
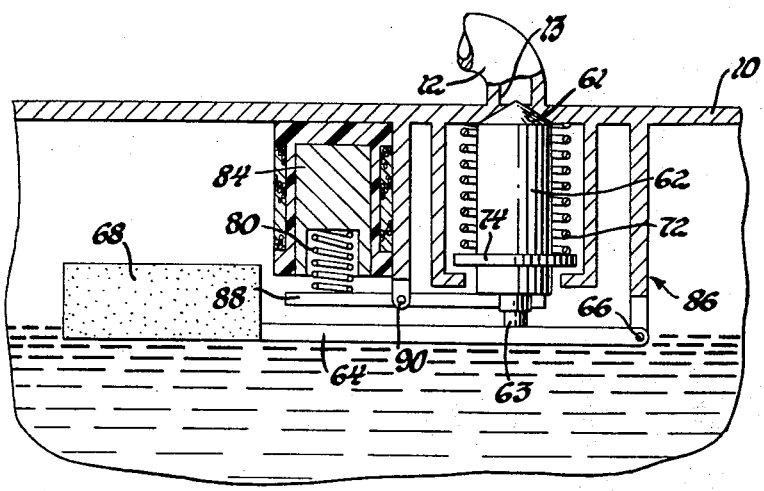

Referring first to FIG. 1, a fuel tank 10 has a vent fitting 12 defining an outlet orifice 13 and to which a vent line 14, 15 is connected. Vent line 14, 15 extends to the engine air cleaner 16 within the air filter element 18 whereby fuel vapors formed in fuel tank 10 may be conducted into the engine induction system for eventual combustion within the engine. A restriction 20 limits vapor flow through line 15.

It also will be appreciated that vent line 14, 15 provides a path for addition of clean air to fuel tank 10 as liquid fuel is withdrawn or as the fluid within tank 10 cools.

In some applications, it may be desirable to meter the fuel vapor and mix it with a proportional amount of air before delivering the fuel vapor to the engine. For this purpose, a valve 22 may be provided. Valve 22 receives a portion of the fuel vapor from a vent line 14, 23 by way of a fitting 24. Fuel vapor in the chamber beneath the main diaphragm 26 lifts diaphragm 26 as the fuel vapor pressure increases. As it lifts, a port 28 in a valve plunger 30 secured to diaphragm 26 is exposed above the edge of a land 32; at the same time, the bottom 34 of plunger 30 exposes the edge of a fitting 36. At such time, clean air is drawn from air cleaner 16 within filter element 18 through an air line 38 to a fitting 40 of valve member 22. The air mixes with the fuel vapor vented from tank 10 through vent line 14, 23, fitting 24, orifice 28 and valve plunger 30. The resulting air-fuel vapor mixture passes out through a fitting 36 and a line 40 to the engine induction passage 42 below the throttle 44.

In some of the applications where a mixing valve such as valve 22 is employed, it also may be desirable to permit flow of the mixture of air and fuel vapor into the induction passage only when throttle 44 is open. For this purpose, a signal line 46 senses a vacuum signal at a port 48 just above throttle 44 whenever throttle 44 is open. Signal line 46 is connected to a fitting 50 on valve unit 22. The vacuum signal is applied against and, at least during most modes of operation, is sufficient to raise a control diaphragm 52 against the bias of a spring 54, thus permitting main diaphragm 26 to be lifted against the bias of its spring 56 by the fuel vapor pressure applied through fitting 24. An opening 58 maintains the space between diaphragms 52 and 26 at atmospheric pressure. When throttle 44 is closed, port 48 senses the substantially atmospheric pressure above throttle 44, and no vacuum signal is applied against control diaphragm 52. Spring 54 then has sufficient force, at least under most conditions, to force main diaphragm 26 downwardly as shown and thereby shut off the flow of air and fuel vapor to line 40.

Air and fuel flow to and from tank 10 through fitting 12 passes through a valve mechanism 60 having a valve seat 61 controlled by a valve member 62. The base 63 of valve member 62 rests on a float arm 64 which is pivoted at 66 and extends to a float 68 responsive to the level of liquid fuel within tank 10. A tang 70 is adapted to engage float arm 66 to prevent float 68 from dropping below a predetermined level. With this construction, it will be appreciated that float 68 will rise as the liquid fuel level rises within tank 10, lifting valve 62 against the bias of a spring 72 and closing it against valve seat 61 to prevent loss of liquid fuel through fitting 12 and vent line 14.

Valve member 62 has a radially extending flange 74 which is biased by spring 72 against a ledge 76 formed within a magnetically responsive sleeve 78. Sleeve 78, and thus valve member 62, is biased upwardly by a spring 80 to lift valve member 62 against the bias of spring 72 and close valve member 62 against valve seat 61 whenever the engine is not operating. When the engine is operating, a switch 82 (operated from the engine ignition switch or otherwise) closes to energize a solenoid coil 84, and sleeve 78 is pulled downwardly against spring 80. This leaves valve member 62 under control of float 68.

Thus valve member 62 is controlled solely by float 68 during engine operation, and valve member 62 is closed by spring 80 irrespective of the fuel level sensed by float 68 whenever the engine is not operating.

Figure 3:
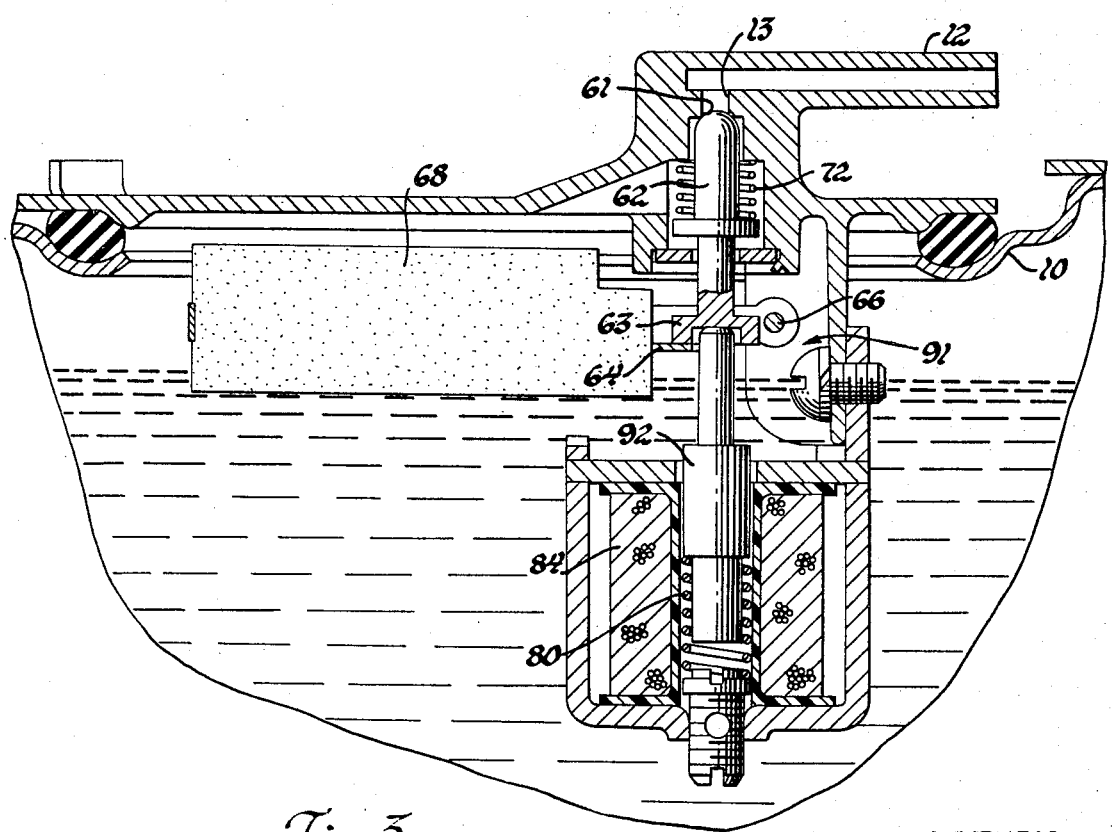
FIG. 3 is a sectional view of another alternative embodiment of the vent control shown in FIG. 1.

FIGS. 2 and 3 illustrate alternative constructions of fuel tank vent control mechanism 60 shown in FIG. 1, and the same reference numerals are used to identify similar parts.

The valve mechanism 86 shown in FIG. 2 also has a valve seat 61 controlled by a valve member 62. The base 63 of valve member 62 rests on a float arm 64 which is pivoted at 66 and extends to a float 68 responsive to the level of liquid fuel within tank 10. With this construction, it will be appreciated that float 68 will rise as the liquid fuel level rises within tank 10, lifting valve 62 against the bias of a spring 72 and closing it against valve seat 61 to prevent loss of liquid fuel through fitting 12 and vent line 14.

Valve member 62 is biased upwardly by a spring 80, which acts through a magnetically responsive armature 88 pivoted at 90, to lift valve member 62 against the bias of spring 72 and close valve member 62 against valve seat 61 whenever the engine is not operating. When the engine is operating, a solenoid coil 84 is energized and armature 88 is pivoted clockwise against spring 80. This leaves valve member 62 under control of float 68.

Thus valve member 62 is controlled solely by float 68 during engine operation, and valve member 62 is closed by spring 80 irrespective of the fuel level sensed by float 68 whenever the engine is not operating.

The valve mechanism 91 shown in FIG. 3 also has a valve seat 61 controlled by a valve member 62. The base 63 of valve member 62 rests on a float arm 64 pivoted at 66 and extending to a float 68 which is responsive to the level of liquid fuel within tank 10. With this construction, it will be appreciated that float 68 will rise as the liquid fuel level rises within tank 10, lifting valve 62 against the bias of a spring 72 and closing it against valve seat 61 to prevent loss of liquid fuel through fitting 12 and vent line 14.

Valve member 62 is biased upwardly by a spring 80, acting through a magnetically responsive armature 92, to lift valve member 62 against the bias of spring 72 and close valve member 62 against valve seat 61 whenever the engine is not operating. When the engine is operating, a solenoid coil 84 is energized and armature 92 is pulled downwardly against spring 80. This leaves valve member 62 under control of float 68.

Thus valve member 62 is controlled solely by float 68 during engine operation, and valve member 62 is closed by spring 80 irrespective of the fuel level sensed by float 68 whenever the engine is not operating.

From the foregoing, it will be appreciated that this invention provides a simplified fuel tank vent control which combines float and solenoid regulation of the tank vent in a compact single valve mechanism which is easily installed in the top of a vehicle fuel tank. Such a fuel tank vent control permits any vapor that may be evolved in the fuel tank to be directed to the engine induction system during engine operation and to be stored in the fuel tank when the engine is not operating; at the same time, protection is provided against loss of liquid fuel through the tank vent.

It also will be appreciated that this fuel tank vent control may be most advantageous when used in a tank which has been insulated, as by a urethane foam coating, to reduce heating of the fuel and concomitant vapor formation and which has been structured to withstand pressure variations of 2.5 psi or greater.

I claim.

1. A fuel tank vent control valve assembly comprising:

means defining an orifice for venting fuel vapor from the top of a tank and a valve seat surrounding said orifice, a vertically reciprocable valve member engageable with said valve seat to prevent fluid flow through said orifice, and means downwardly biasing said valve member out of engagement with said valve seat, a float member responsive to the level of liquid fuel in the tank and having a pivoted float arm extending laterally beneath said valve member whereby upward movement of said float member will cause said float arm to lift said valve member into engagement with said valve seat, and a solenoid having an armature extending beneath said valve member and means upwardly biasing said armature whereby said armature lifts said valve member into engagement with said valve seat, thereby overriding control of said valve member by said float member, said solenoid being energizable to lower said armature and permit control of said valve member by said float member.

2. The control valve assembly of claim 1 wherein said valve member has a radially outwardly extending flange, wherein said armature surrounds said valve member and has a radially inwardly extending flange disposed beneath said valve member flange, and wherein said solenoid has a coil surrounding said armature.

3. The control valve assembly of claim 1 wherein said armature extends laterally from a first portion beneath said valve member through a pivot portion to a second portion disposed beneath a solenoid coil and wherein said armature biasing means downwardly biases said second portion of said armature to upwardly bias said first portion of said armature.

4. Means for controlling venting of an automobile fuel tank associated with an engine having an air induction passage, comprising:

a fuel tank vent line extending from the upper portion of said fuel tank to said air induction passage, means defining an orifice opening from said fuel tank to said vent line and a valve seat surrounding said orifice, a vertically reciprocable valve member engageable with said valve seat to prevent fluid flow through said orifice, and means downwardly biasing said valve member out of engagement with said valve seat, a float member responsive to the level of liquid fuel in said fuel tank and having a float arm extending laterally beneath said valve member to a pivot portion whereby upward movement of said float member will cause said float arm to lift said valve member into engagement with said valve seat, a solenoid having an armature extending beneath said valve member and means upwardly biasing said armature whereby said armature lifts said valve member into engagement with said valve seat, thereby overriding control of said valve member by said float member, and means for energizing said solenoid when said engine is operating to thereby lower said armature and permit control of said valve member by said float member, whereby during engine operation air may flow from said induction system to said fuel tank and fuel vapor may flow from said fuel tank to said induction system, whereby when the engine is not operating the flow of fuel vapor from said fuel tank through said vent line to said induction system is prevented, and whereby the flow of liquid fuel into said vent line from said fuel tank is prevented under all conditions.

* * * * *